(12) United States Patent
Lindqvist et al.

(10) Patent No.: US 10,707,994 B2
(45) Date of Patent: Jul. 7, 2020

(54) ADVANCED ERROR DETECTION CODING

(71) Applicant: Telefonaktiebolaget LM Ericsson (publ), Stockholm (SE)

(72) Inventors: Fredrik Lindqvist, Järfälla (SE); Erik Eriksson, Linköping (SE); Martin Hessler, Linköping (SE); Osman Nuri Can Yilmaz, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 32 days.

(21) Appl. No.: 15/561,552

(22) PCT Filed: Apr. 1, 2015

(86) PCT No.: PCT/SE2015/050406
§ 371 (c)(1),
(2) Date: Sep. 26, 2017

(87) PCT Pub. No.: WO2016/159847
PCT Pub. Date: Oct. 6, 2016

(65) Prior Publication Data
US 2018/0091259 A1 Mar. 29, 2018

(51) Int. Cl.
*H04L 1/00* (2006.01)
*H04L 1/08* (2006.01)
(Continued)

(52) U.S. Cl.
CPC .......... *H04L 1/0041* (2013.01); *H04L 1/0009* (2013.01); *H04L 1/0058* (2013.01);
(Continued)

(58) Field of Classification Search
CPC ... H04L 1/0009; H04L 1/0061; H04L 1/1819; H04L 1/0058; H04L 1/08; H04L 1/0041; H04W 28/04
See application file for complete search history.

(56) References Cited

U.S. PATENT DOCUMENTS

| | | | |
|---|---|---|---|
| 6,182,264 B1* | 1/2001 | Ott | H03M 13/09 |
| | | | 714/774 |
| 2002/0152342 A1* | 10/2002 | Das | H04L 1/0003 |
| | | | 710/117 |

(Continued)

FOREIGN PATENT DOCUMENTS

| | | |
|---|---|---|
| EP | 1931072 A2 | 6/2008 |
| EP | 2129140 A1 | 12/2009 |

(Continued)

OTHER PUBLICATIONS

NN8804166 : 'Software-Based Error Control for Personal Systems Communications Links;'IBM Technical Disclosure Bulletin, Apr. 1988, vol. 30, Issue: 11, pp. 166-171.*

*Primary Examiner* — Guy J Lamarre
(74) *Attorney, Agent, or Firm* — Patent Portfolio Builders, PLLC

(57) ABSTRACT

There is disclosed a method for operating a transmitting node (10, 100) for a wireless communication network, the transmitting node being adapted for transmitting data utilizing error detection coding, wherein the error detection coding has a coding length in bits, the method comprising adapting the coding length based on a retransmission status of the data. There are also disclosed a corresponding method for operating a receiving node and corresponding nodes and program products and storage media.

18 Claims, 4 Drawing Sheets

(51) Int. Cl.
*H04W 28/04* (2009.01)
*H04L 1/18* (2006.01)

(52) U.S. Cl.
CPC ............... *H04L 1/0061* (2013.01); *H04L 1/08* (2013.01); *H04W 28/04* (2013.01); *H04L 1/1819* (2013.01)

(56) References Cited

U.S. PATENT DOCUMENTS

| | | | | |
|---|---|---|---|---|
| 2004/0153909 | A1* | 8/2004 | Lim | H04L 1/0009 714/714 |
| 2007/0206635 | A1* | 9/2007 | Pozhenko | H04L 47/10 370/473 |
| 2009/0219990 | A1* | 9/2009 | Han | H04L 1/0007 375/240.02 |
| 2010/0046415 | A1* | 2/2010 | Kim | H03M 13/2957 370/315 |
| 2010/0097976 | A1* | 4/2010 | Agrawal | H04L 1/1819 370/315 |
| 2011/0078531 | A1 | 3/2011 | Umeda et al. | |
| 2013/0170443 | A1* | 7/2013 | He | H04L 1/0026 370/329 |

FOREIGN PATENT DOCUMENTS

| | | | |
|---|---|---|---|
| EP | 2180625 | A2 | 4/2010 |
| WO | 2013142039 | A1 | 9/2013 |

\* cited by examiner

ADVANCED ERROR DETECTION CODING

TECHNICAL FIELD

The present disclosure pertains to wireless communication networks and technology, in particular to the use of error detection coding.

BACKGROUND

In many wireless communication networks, data is transmitted in packets or transport blocks. Next to the data to be transmitted, each transport block may contain bits for error detection coding (EDC) and forward error correction (FEC, also called channel coding). Error detection coding enables determining whether data has been received (and/or decoded) correctly, whereas forward error correction may facilitate correcting incorrectly received (and/or decoded) data. The encoding (and decoding) for error detection and forward error correction may be separated from each other and may allow independent treatment of the data. The term error coding may generally refer to and/or encompass error detection coding and/or forward error correction coding. Coding may generally refer to encoding and/or decoding, wherein decoding may in particular be performed on a receiver side and/or encoding may be performed on a transmitter side.

These codings may be used in a context with a HARQ-process (Hybrid Acknowledgement ReQuest), in which each transport block to be transmitted is assigned a HARQ-identifier. If a block is determined to be received (and/or decoded) correctly, the receiver (e.g., a terminal or user equipment) may reply with an acknowledgement signal (ACK) for the corresponding HARQ-identifier. If the block is determined not to be received (and/or decoded) correctly, the reply may signal non-acknowledgement (NACK). In this case, the transport block may be scheduled for resending using the same HARQ-identifier one or more times, until an ACK reply is received by the transmitting node.

Coding and decoding (both for error detection and FEC) both require like computational resources and occupy transmit resources like time and/or frequency resources when transmitting correspondingly encoded data or transport blocks. The thus produced overhead can be substantial.

SUMMARY

An object of the present disclosure is to provide solutions limiting the overhead, in particular regarding the use of computational and/or transmit resources, when dealing with data in the context of error coding.

There is disclosed a method for operating a transmitting node for a wireless communication network, the transmitting node being adapted for transmitting data utilizing error detection coding. The error detection coding has a coding length in bits. The method comprises performing adapting the coding length based on a retransmission status of the data.

Moreover, a transmitting node for a wireless communication network is described. The transmitting node is adapted for, and/or may comprise a transmitting module for, transmitting data utilizing error detection coding. It may be considered that the error detection coding has a coding length in bits. The transmitting node further is adapted for, and/or may comprise a coding length adapting module for, adapting the coding length based on a retransmission status of the data.

There is also disclosed a method for operating a receiving node for a wireless communication network, the receiving node being adapted for receiving error encoded data, the method comprising adapting of decoding the error encoded data based on a retransmission status of the data Furthermore, a receiving node for a wireless communication network is described, the receiving node being adapted for, and/or comprising a receiving module for, receiving error encoded data, the receiving node further being adapted for, and/or comprising a decoding module for, adapting of decoding the error encoded data based on a retransmission status of the data.

There is also disclosed a program product comprising code executable by control circuitry, the code causing the control circuitry to perform and/or control any of the methods described herein when executed by the control circuitry, as well as a storage medium storing such a program product.

With the approaches and concepts disclosed herein, it is possible to adapt error coding to the dynamics of data transmission, allowing in particular reducing the overhead in cases in which data already has been transmitted and it may be assumed that the error probability is reduced due to the retransmission or expected to be low, e.g. in the case of MTC, in particular Critical-MTC.

BRIEF DESCRIPTION OF THE DRAWINGS

The figures are intended to illustrate examples of the concepts introduced for the sake of illumination, not limitation.

DETAILED DESCRIPTION

Figure 1:
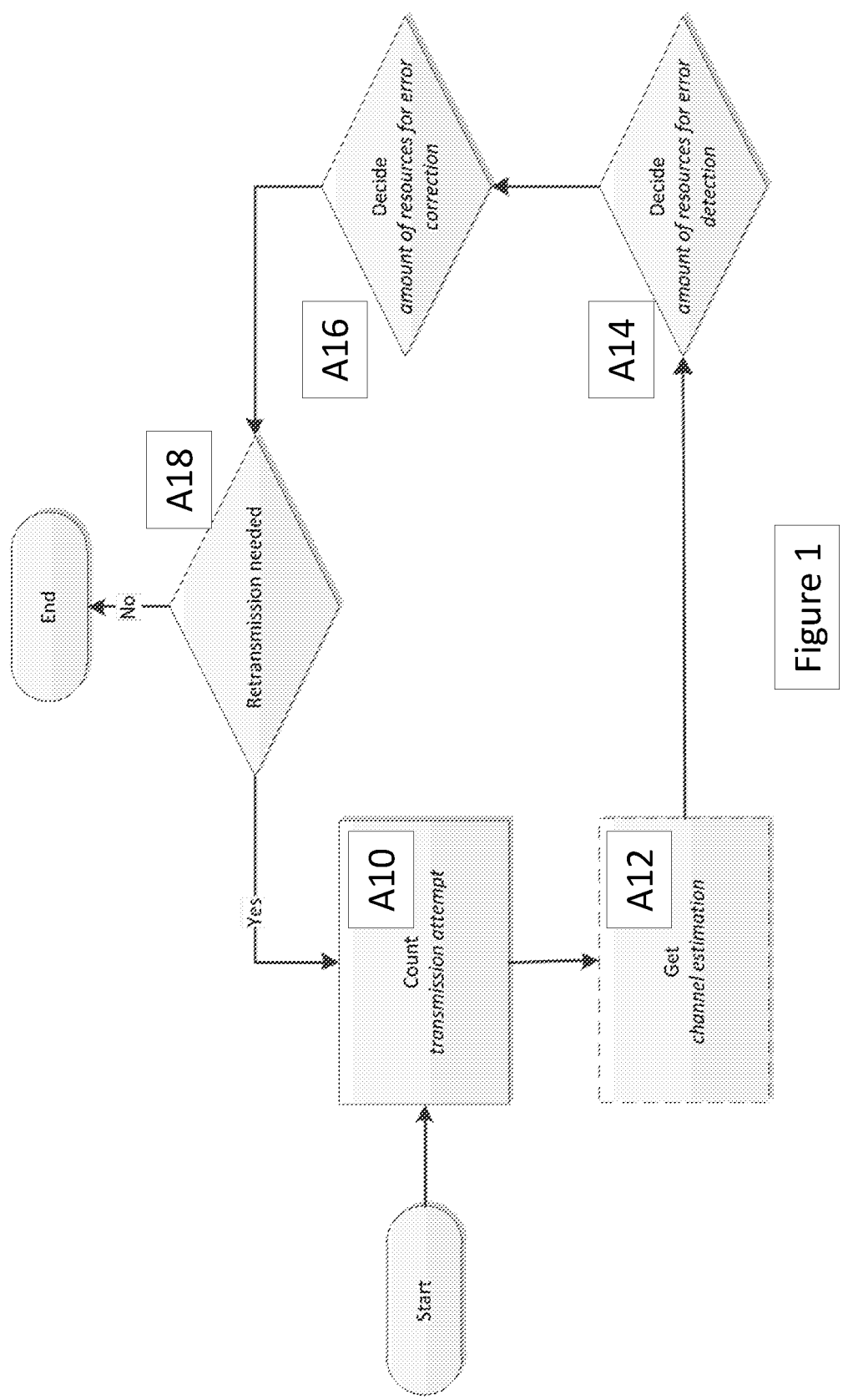
FIG. 1 shows a flowchart of a method for operating a transmitting node.

In the context of this disclosure, the retransmission status of data may indicate whether a block of data, in particular a transport block, is indented and/or provided for (e.g., by a transmission node) and/or received in (e.g., by a receiving node) a first transmission or a subsequent re-transmission, in particular in a HARQ-process. The retransmission status may in particular indicate how often the transport block already has been transmitted (e.g., before the currently intended or scheduled or transmitted) and/or which is the current number of retransmission. A retransmission status may pertain to a specific transport block (respectively the data therein) and/or a specific HARQ process and/or a correspondingly assigned HARQ identifier. A node, in particular a transmitting node or receiving node, may monitor (e.g., count), and/or be adapted for monitoring and/or comprise a monitoring module for monitoring, a retransmission status of a transport block and/or a corresponding HARQ identifier (and, e.g. corresponding transmissions or transport blocks), e.g. by counting the number of transmission or retransmissions (e.g., the number of transmissions for the block or identifier, e.g. for a transmitting node, or the number of received blocks, in particular for the associated identifier, e.g. for a receiving node, and/or storing the blocks transmitted and/or received, e.g. for a receiving node). A HARQ identifier may be reused after it has been determined that a transport block has been transmitted or received successfully, e.g. based on decoding of EDC and/or FEC. A different (re-)transmissions of data, the data may be in different transport blocks, e.g. due to different error detection coding and/or FEC coding.

Data (which may also be called communication data) may generally comprise or be user data and/or control data and/or allocation data. Control data may pertain to controlling a node, e.g. a receiving node, and/or may comprise control signaling Allocation data may pertain to scheduling resources for a receiving node. Control data and/or allocation data may pertain to a configuration (or configurations) for a node be configured, e.g. a terminal or UE.

Data may be transmitted or received in packets, e.g. transport blocks. A transport block of data (called transport block for short) may comprise data, in particular bits of data, to be transmitted, e.g. user data and/or control data and/or allocation data, for example a certain amount of bits and/or having a data bit length (the amount may be adaptable, e.g. according to data transmissions conditions and/or amount of total data to be transmitted). In addition, a transport block may comprise coding for error detection, in particular bits for error detection, which may be called error detection bits or EDC bits, and coding for forward error correction, in particular bits for forward error correction, which may be called (forward) error correction or FEC bits.

Error encoded data may comprise or be data on which error encoding has been performed, in particular EDC and/or FEC. Error encoded data may be transmitted in the form of a transport block, to which a HARQ identifier may be assigned; for retransmissions the transport block assigned the same HARQ identifier may be different due to differences in error coding used, but contain the same data. Data encoded for EDC may be called EDC encoded data, data encoded for FEC may be called FEC encoded data. Data in a transport block may be encoded both for EDC and FEC. FEC may be performed after EDC and/or including bits of error detection coding.

The coding (for error correction) and/or the error detection bits may be provided by performing error detection coding, in particular encoding, the size of the coding may represent or correspond to the number of error detection bits and may be referred to as coding length or error detection coding length. Error detection coding, in particular encoding, may be performed by a transmitting node and/or an EDC encoding module of the transmitting node. A coding may be represented by one or more codes and/or algorithm to be performed when coding. A coding for decoding may be complementary to a corresponding coding for encoding (and vice versa).

Analogously, the correction coding and/or the error correction bits may be provided by performing (forward) error correction coding, in particular encoding, the size of the coding may represent or correspond to the number of error correction bits and may be referred to as correction coding length or error correction coding length. Forward error correction coding, in particular encoding, may be performed by a transmitting node and/or an FEC encoding module of the transmitting node.

Encoding for error detection may comprise determining and/or calculating one or more EDC bits, in particular a predetermined number of EDC bits (corresponding to the coding length) and/or according to a chosen algorithm. In particular, encoding for error detection may comprise utilizing a CRC (Cyclic Redundancy Check) algorithm.

Encoding for forward error correction may comprise determining and/or calculating one or more FEC bits, in particular a predetermined number of FEC bits (corresponding to the correction coding length) and/or according to a chosen algorithm. In particular, encoding for forward error correction may comprise utilizing an error correcting algorithm or code, e.g. a convolutional code and/or a Hamming code and/or Reed-Solomon code and/or a Reed-Muller code and/or a turbo code, or any other suitable FEC code.

Decoding (for error detection coded data and analogously for FEC encoded data) may comprise utilizing a coding for decoding error encoded data, wherein the coding in particular may have a coding length. The coding may be configured, e.g. by a transmission node, and/or be pre-determined. Decoding error detection coding may comprise determining whether (or not) an error occurred when transmitting and/or decoding the data. Decoding error detection decoding and/or such determining may comprise determining a probability that one or more errors occurred (and/or a probability, that no error occurred), based on the error detection coding. This decoding may comprise comparing the probability (and/or corresponding parameter/s or a set of parameters) with a threshold (or corresponding threshold value).

The threshold or value may be configured or pre-defined. It may be considered that the threshold or value is adapted or adaptable based on the retransmission status and/or transmission conditions. If the probability that an error occurred is below the threshold, it may be determined that no error occurred. Determining a probability may comprise calculating and/or estimating the probability and/or a parameter or set of parameters indicative and/or representing the probability. Decoding a FEC coding may comprise soft-combining of previously received error encoded data (in particular of the same transport block and/or the same HARQ process or identifier). If a coding length (and/or correction coding length) has been changed, decoding for FEC or soft-combining may generally comprise re-calculating some values for FEC, e.g., as the FEC may be performed including and/or on error detection coding bits.

A wireless communication network may comprise one or more radio nodes adapted for wireless and/or radio communication. One or more of the nodes may form a Radio Access Network (RAN), e.g. according to one or more specific Radio Access Technologies (RAT), e.g. LTE (Long-Term Evolution, a telecommunication standard describing a RAT) and/or LTE-based. At least one radio node like a base station may be connected or connectable to node providing higher-level functionality and/or a core network.

A radio node in the context of this disclosure may in particular be a transmitting node and/or a receiving node (or vice versa). A transmitting node may in particular be a base station. It may be considered that a receiving node is a terminal or user equipment (UE). A base station may generally be adapted for radio and/or wireless communication with one or more terminals or UEs and/or to control communication to and/or with the terminals or UEs, e.g. by configuring and/or scheduling them. Scheduling may comprise determining and/or assigning time-frequency resources for and/or to communication, in particular for transmission and/or reception, e.g. for Uplink (UL) and/or Downlink (DL) communication. Scheduling may comprise sending corresponding signals or information, e.g. control data or allocation data.

Configuring a node, in particular a receiving node and/or terminal or UE, may comprise sending control data indicating a configuration (which may be allocation data) to the node to be configured. A configuration may describe a setting and/or operational mode for the configured node, which may be adapted to configure itself for such configuration, e.g. based on the corresponding data. A configuration may for example pertain to scheduled resources for the configured node and/or setting for transmission and/or reception or corresponding circuitry like control and/or radio circuitry and/or pertain to coding of data, in particular the decoding of data, e.g. one or more transport blocks of data received and/or to be received and/or intended for the node. A base station generally may be an eNodeB (eNB).

There is disclosed a method for operating a transmitting node for a wireless communication network, the transmitting node being adapted for transmitting data utilizing error detection coding. The error detection coding has a coding length in bits. The method comprises adapting the coding length based on a retransmission status of the data. The method may comprise transmitting the data or error encoded data at least once before adapting the coding length.

Moreover, a transmitting node for a wireless communication network is described. The transmitting node is adapted for, and/or may comprise a transmitting module for, transmitting data utilizing error detection coding. It may be considered that the error detection coding has a coding length in bits. The transmitting node further is adapted for, and/or may comprise a coding length adapting module for, adapting the coding length based on a retransmission status of the data.

Adapting the coding length may be performed after transmitting the data at least once and/or for a retransmission of the data, e.g. within the same HARQ process and/or for the same HARQ process identifier. The transmitting node or the coding length adapting module may be adapted accordingly.

There is also disclosed a method for operating a receiving node for a wireless communication network, the receiving node being adapted for receiving error encoded data, the method comprising adapting of decoding the error encoded data based on a retransmission status of the data. The method may comprise receiving the data or error encoded data at least once before adapting the decoding.

Furthermore, a receiving node for a wireless communication network is described, the receiving node being adapted for, and/or comprising a receiving module for, receiving error encoded data, the receiving node further being adapted for, and/or comprising a decoding module for, adapting of decoding the error encoded data based on a retransmission status of the data.

Adapting the decoding may be performed after receiving (and decoding) the data at least once and/or for a retransmission of the data, e.g. within the same HARQ process and/or for the same HARQ process identifier. The receiving node or the decoding module may be adapted accordingly.

Adapting the coding length and/or adapting the decoding may generally comprise changing (e.g., reducing) the coding length and/or the decoding or decoding method as compared to an earlier or the (directly) preceding transmission of data.

There is also disclosed a program product comprising code executable by control circuitry, the code causing the control circuitry to perform and/or control any of the methods described herein when executed by the control circuitry, as well as a storage medium storing such a program product.

Transmitting utilizing error detection coding may comprise performing encoding for error detection before transmitting. A transmitting node may be adapted for, and/or comprise an EDC encoding module for, such encoding. Alternatively, transmitting utilizing error detection coding may comprise receiving EDC encoded data and transmitting (e.g., relaying) it. It may be considered that transmitting has a target, which may be a receiving node and/or a relaying node, which for example may relay data transmitted to a final or intermediate (relaying) target, wherein a final target may e.g. be a receiving node. Transmitting data may in particular be in the context of Critical-MTC and/or with a defined and/or required BLER of $10^{-4}$ or below, in particular $10^{-5}$ or below or $10^{-6}$ or below, and/or between $10^{-6}$ and $10^{-9}$ or below. Transmitting may include re-transmitting data, in particular in the context of a HARQ-process and/or based on a NACK indication received, e.g. from a receiving node.

Adapting the coding length based on a retransmission status of the data may comprise encoding for error detection with a coding having a different length and/or using a different coding algorithm (in particular, having a different coding length) for encoding than coding used in an earlier transmission of the (same) data or transport block.

The coding or algorithm used for encoding (and/or the coding length) may be selected from a pre-defined or configured set of codings or algorithms or coding lengths, which may e.g. be stored in a memory of the transmission node.

The error detection coding may generally comprise or be CRC coding.

It may be considered that adapting the coding length comprises reducing the coding length for retransmission of the data, for example by selecting a corresponding coding and/or coding length. The coding length may be reduced sequentially and/or more than once for a sequence of retransmissions and/or according to a pre-defined or configured scheme. By reducing the coding length, both the computational power and the total amount of bits to be transmitted (in the transport block) may be reduced. In a variant, reducing the coding length may comprise increasing a correction coding length (of FEC), e.g. to keep the sum of bits represented by coding length and correction coding length constant (e.g., in comparison of an earlier transmission of the data, in particular earlier within the same HARQ process), or to lower the sum below a sum of the bits of a corresponding earlier transmission. The earlier transmission may be the directly preceding transmission.

Generally, adapting the coding length, e.g. for encoding or decoding, may be performed for retransmitting the data or retransmitted data, respectively. In particular, such adapting may pertain to data intended for retransmission or transmitted at least once before, e.g. within the same HARQ process and/or for the same identifier.

Adapting the coding length may be based on transmission conditions, in particular channel conditions.

Transmission conditions may generally be determined based on and/or comprise a SIR/SINR and/or interference and/or transmitting power and/or received power and/or corresponding measurements and/or report/s, e.g. transmission feedback, and/or one or more transmission condition reports, from at least one receiving node, which e.g. may indicate transmission conditions like SIR/SINR and/or received power and/or CSI measurement reports. The transmission node may receive, and/or be adapted for receiving, and/or comprise a report or feedback receiving module for receiving, transmission feedback and/or one or more transmission condition reports, e.g. from one or more receiving nodes. Thus, the overhead involved with error coding may be responsive to transmission conditions and generally be lowered for good transmission conditions. It may be considered that transmission conditions comprise information pertaining to the data or type of data, e.g. Quality of Service level associated to the data, and/or whether the data is control data or user data. Transmission conditions may pertain and/or be determined for a previous transmission of the encoded data, in particular the directly preceding transmission.

The method for operating a transmission node may comprise performing forward error correction coding on the data, in particular after error detection coding, the forward error correction coding having a correction coding length in bits. The coding performed may be encoding. The encoding may be performed before transmitting the (error encoded) data.

Alternatively or additionally, the method may comprise adapting a correction coding length for forward error correction coding of the data based on the retransmission status of the data and/or transmission conditions, in particular channel conditions.

The transmitting node may further be adapted for, and/or comprise a FEC module for, performing forward error correction coding on the data, in particular after error detection coding, the forward error correction coding having a correction coding length in bits. The coding performed may be encoding. The encoding may be performed before transmitting the (error encoded) data.

Alternatively or additionally, the transmitting node may be adapted for adapting a correction coding length for forward error correction coding of the data based on the retransmission status of the data.

Generally, adapting of decoding the error encoded data may further be based on transmission conditions, in particular channel conditions.

Adapting of decoding the error encoded data may comprise adapting a threshold value for error detection. Adapting a threshold value may in particular comprise increasing the probability that it is determined that no error occurred (e.g. when decoding), which may lower the overhead needed for decoding. Alternatively or additionally, adapting of decoding the error encoded data may comprise adapting a number of hypotheses for codewords tested for correctness with the error detection coding based on the retransmission status, e.g. increasing the number of hypotheses with increasing number of (re-) transmissions.

Alternatively or additionally, adapting of decoding the error encoded data may comprise adapting a coding length for decoding of error detection coding the data is encoded with. It may be considered that adapting the coding length comprises reducing the coding length, e.g. for retransmission of the data (e.g., as received by the receiving node), for example by selecting a corresponding coding and/or coding length. The coding length may be reduced sequentially and/or more than once for a sequence of retransmissions and/or according to a pre-defined or configured scheme. By reducing the coding length, both the computational power and the total amount of bits to be transmitted (in the transport block) may be reduced. In a variant, reducing the coding length may comprise increasing a correction coding length (of FEC), e.g. to keep the sum of bits represented by coding length and correction coding length constant (e.g., in comparison of an earlier transmission of the data, in particular earlier within the same HARQ process), or to lower the sum below a sum of the bits of a corresponding earlier transmission. The earlier transmission may be the directly preceding transmission.

Adapting of decoding the error encoded data may comprise adapting a correction coding length for decoding of forward error correction coding the data is encoded with.

The transmitting node may receive, and/or be adapted for receiving, and/or comprise a reception module for receiving, a transmission feedback, e.g. from a receiving node. Transmission feedback may generally comprise an ACK or NACK, in particular pertaining to a specific retransmission process and/or HARQ process and/or transport block, which may be represented by a corresponding identifier, e.g. a HARQ process identifier. Transmitting data may comprise retransmitting data based on transmission feedback, in particular based on a NACK received. It may be considered that transmission feedback comprises one or more transmission condition reports.

The receiving node may transmit, and/or be adapted for transmitting, and/or comprise a feedback transmitting module for transmitting, transmission feedback to a transmitting node, from which the error encoded data may be received. The transmission feedback may be determined based on decoding error coding, in particular decoding error detection coding and/or FEC.

It may be considered that the transmitting node configures, and/or is adapted for configuring, and/or comprises a configuring module for configuring, a receiving node with a coding for EDC and/or a coding for FEC and/or a coding length and/or correction coding length and/or a scheme for adapting the coding and/or coding length and/or FEC coding and/or correction coding length and/or for adapting its decoding to correspond to the adapted error coding utilized for transmitting the data, in particular for error detection coding and/or FEC coding. Alternatively or additionally, such configuring may comprise configuring the receiving node with one or more threshold values to be used for error decoding, in particular error detection decoding. Such configuring may comprise transmitting a corresponding indication of which EDC coding and/or coding length and/or FEC coding and/or correction coding length and/or scheme and/or threshold value is to be used for decoding. Decoding error encoded data may be based on such a configuration, which may be received from the network, in particular a transmitting node.

The concepts and ideas discussed herein are particularly applicable to 5G radio concepts or Machine-Type-Communication (MTC). For example, one main object of a 5G radio concept is to support highly reliable and low delay machine-type communication (MTC), so-called Critical-MTC. The Critical-MTC concept should address the design trade-offs regarding e.g., end-to-end latency, transmission reliability, system capacity and deployment, and provide solutions for how to design a wireless network for different industrial application use case. The Critical MTC system should allow for the coexistence between different classes of applications: with low latency sporadic data (e.g., alert message) and with real-time periodic data (or simply best-effort data). An alert message (e.g., alarm) is one important type of messages that needs support for critical MTC application. The ultra-high reliability of Critical MTC dictates that even the worst case scenarios need to be supported. This differs from traditional mobile broadband (e.g. LTE) where a BLER of 0.1 is common, in comparison to $10^{-6}$-$10^{-9}$ that are discussed for Critical MTC applications. The mechanism used in today's 3G/4G MBB systems for detecting block errors is by means of including n error detection coding like a cyclic redundancy check (CRC), i.e. a check-sum, to the block of data bits (within the transport block) received at the physical layer from higher layers (e.g. MAC and RLC). CRCs are widely used for detecting random errors in data communication and storage media. Examples of common CRCs are: CRC-16-CDMA2000 is used in 3G mobile networks;

CRC-CCITT is used in Bluetooth;
CRC-32 is used in Ethernet, HDLC protocols;
CRC-40-GSM is used in GSM control channel.
where CRC-n denotes a CRC with the generator polynomial of degree n. A CRC with the generator polynomial of degree n detects all burst errors of length n or less. The CRC encoding and decoding can be efficiently implemented using a Linear Feedback Shift Register (LFSR).

After the error detection code, in particular CRC, has been added, channel coding is included to allow for forward error correction (FEC), which may include adding redundancy bits. Commonly used FEC codes are turbo codes and convolutional codes. While the FEC enables correcting certain bit errors, the CRC only allows the receiver to detect, typically with high probability, whether the block contains any bit errors. If at least one bit error is detected within the block at the CRC decoding, a non-acknowledge (NACK) is sent to the transmitter to inform that the block should be re-transmitted. This mechanism is referred to as hybrid-ARQ (HARQ) where multiple parallel HARQ processes can be employed. At each re-transmission, the same CRC is commonly included to the data, even though the redundancy bits (used in FEC) may differ dependent on the redundancy versions used by the HARQ (e.g. chase combining or incremental redundancy). This has the advantage that the transmitter does not need to re-calculate the CRC. By soft combining all (erroneously) received blocks within the same HARQ process, the effective BLER is successively decreased for each re-transmission at the cost of increased delay and computational complexity. However, for a fading radio channel this re-transmissions mechanism offered by the HARQ-CRC scheme has proved successful for MBB systems employed today.

Current standards for e.g. 3G (HSPA, UMTS) and 4G (LTE) systems are designed primarily for packed-based (block-based) mobile broadband (MBB) communication. This means that the system requirements are quite different from the herein considered system of MTC communication with low delay and ultra-high reliability (i.e. MTC critical). For example, the block-error rate (BLER) of 3G/4G MBB is typically designed for roughly 0.1 whereas for MTC Critical applications the system needs to operate with much lower BLER, for instance $10^{-9}$. This implies that the probability of a block error, i.e. the likelihood of a transmission time interval (TTI) becoming erroneously detected, can be in the order of 1 out of 1 billion. That is, a very rare event indeed. Hence, if these systems utilize an error detection mechanism, for example, by utilizing a re-transmission mechanism based on the HARQ-CRC scheme, the control overhead will in practice only be of effective use at very rare events. In many MTC applications the situation is made more severe by the fact that the number of information bits is much smaller than in typical data transmissions like web-surfing, ftp-download and video-streaming. Hence, the CRC overhead should be kept to a minimum in order for the system to be (spectrum) efficient. However, by decreasing the CRC overhead the strength of the CRC also decreases, which means that the probability of a missed block-error increases. The latter is undesirable since it can result in that the block will (likely) be detected as erroneous first at a higher layer, which also typically employs CRC, and hence causes a re-transmission at higher layers, leading to additional system delays.

A concept described herein comprises adapting the amount of resources for error detection based upon the error probability of the transmission. For example, by varying the length of the CRC to the HARQ re-transmission scheme in order to keep the control overhead to a minimum while at the same time not decrease the probability of missed detection of an erroneous block. This should be seen in the light of that a MTC-critical package could be fairly short, implying that the CRC would constitute a non-negligible overhead.

Some proposed solutions include a reduction of the coding length for error detection coding (e.g., a CRC length) at least once or even each re-transmission in order to lower the control overhead. A set of embodiments described below are envisioned.

In the first three embodiments, the proposed solution reduces the control overhead by employing adapted amount of error detection, for example, by adapting the CRC length. In the last embodiment, the reduced CRC overhead is used to strengthen the FEC (i.e. increased FEC overhead), which potentially lowers the number of re-transmissions and thereby decreases the (re-)transmission delay. The latter may be of particular importance for Critical-MTC applications.

In one embodiment, the successive reduction of the CRC coding length is determined by a standardized scheme known to both the transmitter and the receiver, e.g. a pre-defined scheme. For instance, a 24-bit CRC (having a corresponding coding length of 24 bit) may be used at first transmission attempt, while a 16-bit CRC is used thereafter, and possibly an 8-bit CRC is used for a third or last re-transmission attempt. With the proposed solution, an erroneously detected code word is signaled by the receiver as a NACK to the transmitter to allow re-transmissions. The transmitter will then first reduce the CRC length according to a standardized procedure known by both transmitter and receiver. More specifically, the CRC length is determined by the re-transmission count. The new CRC is calculated for the original transport block used at the first transmission attempt, received from the MAC layer. After the CRC inclusion, channel coding is performed where the number of transmitted redundancy bits (FEC) may correspond to the redundancy version employed and the re-transmission number in the HARQ process. Given the shorter packet size (due to lower CRC length), the re-transmission mechanism can be made fast. Hence the channel variations (channel conditions or transmission conditions) between successive transmissions are typically negligible and the channel may be considered as (approximately) stationary. The receiver can therefore utilize coherent combining in order to increase the SINR prior to FEC decoding. This increases the likelihood of correct decoding which is thus traded against the reduced CRC length.

It should be noted that soft-combining as in LTE may not be straightforwardly applicable, since when the CRC changes between re-transmissions, the FEC bits may have to be re-calculated.

In another embodiment, adapting and/or an adaptation-formula of or for the CRC may be based on transmission conditions, e.g. set of reliability measurements such as SINR and previous transmission attempts, etc., to allow e.g. the instantaneous transmission or channel conditions to impact the CRC length.

This embodiment differs from the above embodiment in how the number of CRC bits (representing the coding length) for a re-transmission attempt is obtained. More specifically, adapting the coding length, namely the CRC bits, is performed based on or according to transmission or channel conditions, e.g. based on SINR measurements. As the measurements take place at the receiver side (or a receiving node), measurement results or an indication thereof may be signaled as part of the NACK feedback and/or as transmission feedback. For systems requiring very few number of feedback bits, it is proposed to quantize the measurement results and only feedback an index to a look-up table where the transmitter retrieves the CRC length. As in the above embodiment, the receiver or receiving node may typically employ coherent combining (soft-combining) to take advantage of accumulated energy with re-transmissions.

In another embodiment, a scheme may be employed that gradually reduces both FEC bits and CRC bits, for instance based on a change in the transmission or channel conditions.

FIG. 1 shows an example flowchart of a method for operating a transmitting node. When transmitting error encoded data, in an action A10 the number of the transmission attempt of the (same) data or within the same HARQ process may be counted to determine the retransmission status. In an optional action A12, a channel estimate as representative of transmission conditions may be obtained or gotten, e.g. via a transmission feedback. In action A14, based on the channel estimate (or, more generally, based on transmission conditions), if action A12 has been performed, and the retransmission status, the resources for error detection coding, in particular the coding length, may be determined. The resources (correction coding length) for FEC may be determined in A16. After transmitting the data utilizing error detection coding and FEC coding according to the determinations in A14 and A16, in action A18 it may be determined whether another retransmission is needed, e.g. based on transmission feedback. If so, it may be continued with action A10 with an increased count of transmissions. If not, the transmission of this data may be ended, and e.g. a new HARQ process may be started with new data.

Thus, as shown in the flow-chart in FIG. 1, in addition to ACK/NACK response (as part of a transmission feedback) and the retransmission count, channel estimation e.g., based on the instantaneous channel knowledge or the channel knowledge from the previous attempt may be used when deciding for the number of error correcting redundancy bits (i.e. number of FEC bits) and/or the number of bits for EDC. Depending on the channel condition, redundancy bits can be increased, reduced or kept the same whereas error detecting CRC bits are likely to be reduced in every retransmission attempt, depending on the scheme used for coding length adapting.

In another embodiment, the scheme for determining the number of reduced CRC bits comprises determining the number of increased FEC bits possible to employ without increasing the control overhead with respect to the first transmission attempt. For example, a reduction in CRC coding length may be used to strengthen (increase the correction coding length) the FEC. Although the latter does not decrease the control overhead, it will potentially lead to fewer re-transmissions compared to fixed-length CRC/FEC, and hence result in lower re-transmission delays.

In another embodiment, the overhead reduction may be on the receiver side, e.g. for the receiving node. In some implementations this may be known on the transmitter side, in some the transmitting node is unaware. In this embodiment, error detection coding may be adapted based on the retransmission status such that the threshold for accepting or determining a decoding as correct is adapted. For example, a standard decoder may calculate the confidence, i.e. the estimated probability that the most likely code word is the correct code word, as an example of determining a probability of correct decoding. This confidence probability may be denoted $G_j$ for attempt j. In this embodiment, a decoding attempt will be seen as successful if $G_j > T_j$ for some threshold or threshold value $T_j$ such that a required error-detection error probability $D_j$ is fulfilled. The requirement may be dictated by a standard or application of the receiving node. The choice of $T_j$ to fulfill this criteria may depend on details in the decoder, channel-estimator etc, which are not further described herein, which may be configured by the network or a transmitting node. The overhead in this embodiment is related to the probability that, given that the decoding is correct, the decoding result is not accepted if $G_j \leq T_j$ i.e. the overhead is lowered if we can make the threshold smaller. To lower the overhead, the threshold or corresponding value may be adapted for retransmissions such that thresholds $T_1 \geq T_2 \geq \ldots \geq T_{k-1}$ are determined or utilized for error detection decoding, which achieves $D_1 \leq D_2 \leq \ldots \leq D_{k-1}$. The indices here indicate the number of transmission (representing the retransmission status) of the error encoded data. For this approach, error detection (de)coding may be based on a known or assumed coding length, which may be, e.g. pre-defined (and/or stored in a memory of the receiving module) and/or received from the network, in particular a transmitting node. This approach does not require changes on the transmitter side per se, however, it may be combined with adapting the coding length and/or with the transmitting node configuring, and/or being adapted for configuring and/or comprising a configuring module for configuring, a receiving module with a coding length and/or one or more threshold values used for error detection coding.

A further embodiment for reducing overhead reduction on the receiver side is presented. Again, in some implementations this may be known on the transmitter side, in some the transmitting node is unaware.

Assuming an error detection coding or scheme therefor or for the coding length adaption, e.g. a fixed coding length S, for a code-word C, the overhead may be reduced on the receiver side as follows. The receiving node (or a decoder or decoder module of the receiving node) may decode, or be adapted for decoding, based on guessing a most likely codeword, and/or may provide or determine multiple hypotheses for codewords. The codewords may be checked using the error detection coding, e.g. fixed-length CRC. Using this technique, the "efficient" CRC length may be reduced. For example, for a 24 bit CRC and a number of guesses of $8=2^3$, the "efficient" CRC length may be reduced to 21 bits. The number of hypotheses may be limited, for example, due to complexity and that the error behavior could become complex with many hypothesis in some scenarios. This approach is possible to implement with very minor updates to the decoding implementation of a, for example, Turbo-decoder.

To exemplify, suppose $D_1$ (defined as above) is to be very low, for example, less than $10^{-9}$ if $P_1 = 10\%$ then for the CRC P, at least 30 bits for the CRC S have to be used. Assume further that $P_j = 10^{-j}$, then $D_j \approx 10^{-(10-j)}$. This implies that the efficient number of bits needed is 30, 27, 24, . . . 4 and hence we would allow (at most) 1, 8, 64, . . . , $2^{26}$ hypothesis in the decoding attempts (note that the last numbers are for completeness only and it is unlikely that $2^{26}$ are being provided and tested). This approach may also be combined with adapting the coding length.

Error Detection Probability Adaptation

An error-detection probability adaptation used to scale the error detection overhead is described, which illustrates the technical principle that is behind the performance gains achieved. The principle is that if the error probability for FEC decoding is $P_j$ in decoding attempt j, and the error-detection (CRC) error probability is $D_j$ given that a wrong FEC decoding has occurred, then the packet error rate for some maximum number of k transmission attempts should fulfill $$\sum_{j=1}^{I-1} P_j D_j + P_k < \text{Error rate}$$

That is, the probability that decode after all k transmissions will fail is $P_k$, but if detecting the decoding error fails in some previous step this will also result in an error. Hence, $P_1 \geq P_2 \geq \ldots \geq P_k$, which implies that for a resource efficient solution, the error detection error probabilities should be $D_1 \leq D_2 \leq \ldots \leq D_{k-1}$. For example, if k=10 and error rate $10^{-9}$ is desired, one possible solution is to use $P_j D_j \approx P_k \approx 10^{-10}$. To further clarify the notation, there may be considered two examples. In the first example, suppose that $P_k$ is 1 which implies that $D_j$=0. For the second example, suppose $P_1$ is 0, then $D_j$ are undefined but we can redefine $D_j$ as 0 in this case (or actually any number in [0,1]).

Thus, based on e.g. SINR measurements at re-transmission attempt k-1, $P_{k-1}$ can be estimated. By further assuming stationary channel conditions, $P_k = P_{k-1}$, thus $D_k$ may be solved for via the above equation, for a desirable or give Error rate. The CRC length (coding length (indicated by $D_k$) can be transferred to the transmitting node as part of the NACK message.

Figure 2:
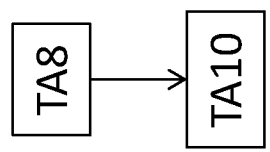
FIG. 2 shows an example of a method for operating a transmitting node.

FIG. 2 schematically shows a method for operating a transmitting node for or in a wireless communication network. The transmitting node may be adapted for transmitting data utilizing error detection coding, wherein the error detection coding has a coding length in bits. The method may comprise an action TA10 of adapting the coding length based on a retransmission status of the data, e.g. as described above. An optional action TA8 may include at least a first transmission before action TA10.

Figure 3:
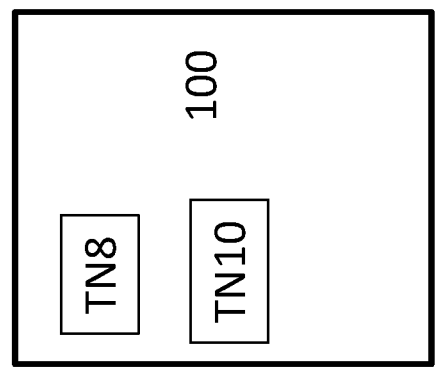
FIG. 3 shows an example for a transmitting node.

FIG. 3 shows an example for a transmitting node 100, which may be a radio node or network node, in particular a base station or eNodeB. The transmitting node 100 may comprise an optional transmitting module TN8 for performing action TA8 and a coding length adapting module TN10 for performing action TA10.

Figure 4:
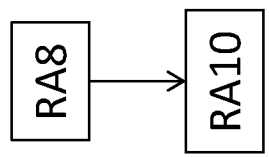
FIG. 4 shows an example of a method for operating a receiving node.

FIG. 4 schematically shows a method for operating a receiving node for or in a wireless communication network. The receiving node may be adapted for receiving error encoded data. The method may comprise an action RA10 of adapting the decoding based on a retransmission status of the data, e.g. as described above. An optional action RA8 may include receiving the data at least twice before action TA10 and/or performing a decoding of at least a first transmission of the data at least once before action RA10.

Figure 5:
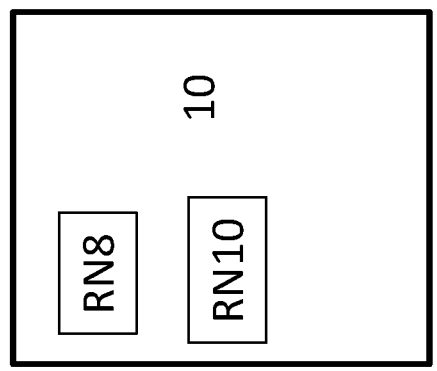
FIG. 5 shows an example for a receiving node.

FIG. 5 schematically shows an example for a receiving node 10, which may be a radio node, in particular a terminal or UE. The receiving node 10 may comprise an optional receiving module RN8 for performing action RA8 and an adapting module RN10 for performing action RA10.

Figure 6:
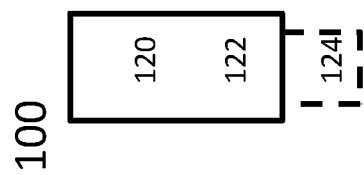
FIG. 6 shows an example for a transmitting node.

FIG. 6 schematically shows a transmitting node 100, which may in particular be a network node or base station or eNodeB. Transmitting node 100 comprises control circuitry 120, which may comprise a controller connected to a memory. A receiving module and/or transmitting module and/or control or processing module and/or scheduling module and/or modulation and/or configuring module, may be implemented in and/or executable by the control circuitry 120. The control circuitry is (operatively) connected or connectable to control radio circuitry 122 of the network node 100, which provides receiver and transmitter and/or transceiver functionality. An antenna circuitry 124 may be connected or connectable to radio circuitry 122 for signal reception or transmittance and/or amplification. The transmitting node 100 may be adapted to carry out any of the methods for operating a transmitting node disclosed herein; in particular, it may comprise corresponding circuitry, e.g. control circuitry. Modules of a transmitting node as described herein may be implemented in software and/or hardware and/or firmware in corresponding circuitry.

Figure 7:
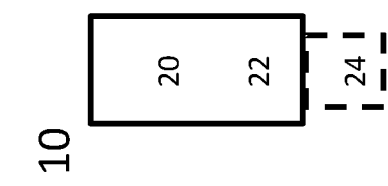
FIG. 7 shows an example of a receiving node.

FIG. 7 shows an example of a receiving node 10, which may be implemented as a user equipment or terminal. Receiving node 10 comprises control circuitry 20 and also comprises radio circuitry 22 providing receiving and transmitting or transceiving functionality, the radio circuitry 22 being (operatively) connected or connectable to the control circuitry 20. An antenna circuitry 24 may be (operatively) connected or connectable to the radio circuitry 22, e.g. to collect or send and/or amplify signals. Radio circuitry 22 and the control circuitry 20 controlling it (and, e.g. the antenna circuitry) are configured for cellular communication with a network or a network node, in particular a transmitting node, e.g. node 100. The radio node 10 may be adapted to carry out any of the methods for operating a receiving node disclosed herein; in particular, it may comprise corresponding circuitry, e.g. control circuitry. Modules or functionality of a receiving node as described herein may be implemented in software and/or hardware and/or firmware in corresponding circuitry.

Generally, control circuitry may comprise integrated circuitry for processing and/or control, e.g. one or more processors and/or processor cores and/or FPGAs (Field Programmable Gate Array) and/or ASICs (Application Specific Integrated Circuitry). Control circuitry may comprise and/or be connected to and/or be adapted for accessing (e.g. writing to and/or reading from) memory, which may comprise any kind of volatile and/or non-volatile memory, e.g. cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g. data pertaining to communication, e.g. configuration/s and/or address data of nodes, etc. Control circuitry may be adapted to control any of the methods described herein and/or to cause such methods to be performed, e.g. by the radio node. Corresponding instructions may be stored in the memory, which may be readable and/or readably connected to the control circuitry.

Radio circuitry may comprise receiving circuitry (e.g. one or more receivers) and/or transmitting circuitry (e.g. one or more transmitters). Alternatively or additionally, radio circuitry may comprise transceiving circuitry for transmitting and receiving (e.g. one or more transceivers). It may be considered that radio circuitry comprises a sensing arrangement for performing LBT/CCA. Antenna circuitry may comprise one or more antennas or antenna elements, which may be arranged in an antenna array.

Configuring a radio node, in particular a user equipment, may refer to the radio node being adapted or caused or set to operate according to the configuration. Configuring may be done by another device, e.g. a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. regarding a freeze interval and/or a transmission start interval. A radio node may configure itself, e.g. based on configuration data received from a network or network node.

Generally, configuring may include determining configuration data representing the configuration and providing it (e.g., via transmitting) to one or more other nodes (parallel and/or sequentially), which may transmit it further to the radio node (or another node, which may be repeated until it reaches the wireless device). Alternatively or additionally, configuring a radio node, e.g. by a network node or other device, may include receiving configuration data and/or data pertaining to configuration data, e.g. from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g. an X2 interface in the case of LTE.

A storage medium may generally be computer-readable and/or accessible and/or readable by control circuitry (e.g., after connecting it to a suitable device or interface), and may comprise e.g. an optical disc and/or magnetic memory and/or a volatile or non-volatile memory and/or flash memory and/or RAM and/or ROM and/or EPROM and/or EEPROM and/or buffer memory and/or cache memory and/or a database and/or an electrical or optical signal.

Generally, a transmitting node and receiving node may be defined by their respective functionality as described herein. It may be considered that one physical device combines both functionalities and thus is configured to be both a transmitting node and receiving node, based on its respective interaction with at least one other radio node.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3G PP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Some Abbreviations

3GPP 3rd Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CCA Clear Channel Assessment
CIS Transmission Confirmation Signal
CoMP Coordinated Multiple Point Transmission and Reception
CQI Channel Quality Information
CRS Cell-specific Reference Signal
CSI Channel State Information
CSI-RS CSI reference signal
D2D Device-to-device
DCI Downlink Control Information
DL Downlink
   Downlink; generally referring to transmission of data to a node/into a direction further away from network core (physically and/or logically); in particular from a base station or eNodeB terminal; more generally, may refer to transmissions received by a terminal or node (e.g. in a D2D environment); often uses specified spectrum/bandwidth different from UL (e.g. LTE)
DMRS Demodulation Reference Signals
DRS Discovery Reference Signal
eNB evolved NodeB; a form of base station, also called eNodeB
EPDCCH Enhanced Physical DL Control CHannel
E-UTRA/N Evolved UMTS Terrestrial Radio Access/Network, an example of a RAT
FDD Frequency Division Duplexing
HARQ Hybrid Automatic Repeat reQuest
ID Identity
L1 Layer 1
L2 Layer 2
LA Licensed Assisted
LA Licensed Assisted Access
LBT Listen-before-talk
LTE Long Term Evolution, a telecommunications standard
MAC Medium Access Control
MBSFN Multiple Broadcast Single Frequency Network
MCS Modulation and Coding Scheme
MDT Minimisation of Drive Test
NW Network
O&M Operational and Maintenance
OFDM Orthogonal Frequency Division Multiplexing
OSS Operational Support Systems
PC Power Control
PCFICH Physical Control Format Indicator Channel
PDCCH Physical Downlink Control Channel
PDCCH Physical DL Control CHannel PH Power Headroom
PHR Power Headroom Report
PMI Precoding Matrix Indicator
PRB Physical Resource Block
PSS Primary Synchronization Signal
PUCCH Physical Uplink Control Channel
PUSCH Physical Uplink Shared CHannel
RA Random Access
RACH Random Access CHannel
RAT Radio Access Technology
RB Resource Block
RE Resource Element
RI Rank Indicator
RRC Radio Resource Control
RRH Remote radio head
RRM Radio Resource Management
RRU Remote radio unit
RSRP Reference signal received power
RSRQ Reference signal received quality
RSSI Received signal strength indicator
RX reception/receiver, reception-related
SA Scheduling Assignment
SCell Secondary Cell
SFN Single Frequency Network
SINR/SNR Signal-to-Noise-and-Interference Ratio; Signal-to-Noise Ratio
SON Self Organizing Network
SR Scheduling Request
SRS Sounding Reference Signal
SSS Secondary Synchronization Signal
TDD Time Division Duplexing
TPC Transmit Power Control
TTI Transmission-Time Interval
TX transmission/transmitter, transmission-related
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency; generally, UL may refer to transmission by a terminal (e.g. to a network or network node or another terminal, for example in a D2D context).

These and other abbreviations may be used according to LTE standard definitions

The invention claimed is:

1. A method for operating a transmitting node for a wireless communication network, the transmitting node transmitting data by utilizing error detection coding, wherein the error detection coding has a coding length in bits, the method comprising:
    determining a retransmission status of the data by counting a number of transmission attempts of the data;
    adapting the coding length based on the retransmission status of the data, wherein adapting the coding length comprises reducing the coding length for retransmission of the data;
    performing forward error correction coding on the data after the error detection coding, the forward error correction coding having a correction coding length in bits; and
    adapting the correction coding length for the forward error correction coding, wherein adapting the correction coding length comprises increasing the correction coding length for the retransmission of the data.

2. The method according to claim 1, wherein the error detection coding comprises or is a cyclic redundancy check (CRC) coding.

3. The method according to claim 1, wherein adapting the coding length further comprises adapting the coding length based on transmission channel conditions.

4. The method according to claim 1, further comprising adapting the correction coding length for the forward error correction coding of the data based on the retransmission status of the data and/or transmission channel conditions.

5. A transmitting node for a wireless communication network, the transmitting node transmitting data by utilizing error detection coding, wherein the error detection coding has a coding length in bits, the transmitting node comprising:
    at least one transmitter configured to transmit the data; and
    at least one processor operatively associated with the at least one transmitter and configured to:
        determine a retransmission status of the data by counting a number of transmission attempts of the data;
        adapt the coding length based on the retransmission status of the data, wherein to adapt the coding length, the at least one processor is configured to reduce the coding length for retransmission of the data;
        perform forward error correction coding on the data after the error detection coding, the forward error correction coding having a correction coding length in bits; and
        adapt the correction coding length for the forward error correction coding, wherein to adapt the correction coding length, the at least one processor is configured to increase the correction coding length for the retransmission of the data.

6. The transmitting node according to claim 5, wherein the error detection coding comprises or is a cyclic redundancy check (CRC) coding.

7. The transmitting node according to claim 5, wherein the at least one processor is configured to adapt the coding length further based on transmission channel conditions.

8. The transmitting node according to claim 5, wherein the at least one processor is further configured to adapt the correction coding length for the forward error correction coding of the data based on the retransmission status of the data and/or transmission channel conditions.

9. A method for operating a receiving node for a wireless communication network, the receiving node receiving error encoded data, the method comprising:
    determining a retransmission status of data by counting a number of transmission attempts of the data; and
    adapting decoding of the error encoded data based on the retransmission status of the data, wherein adapting the decoding of the error encoded data comprises:
        adapting a coding length for decoding of an error detection coding that the data is encoded with, wherein adapting the coding length comprises reducing the coding length; and
        adapting a correction coding length for decoding of forward error correction coding that the data is encoded with after the error detection coding, wherein adapting the correction coding length comprises increasing the correction coding length.

10. The method according to claim 9, wherein adapting the decoding of the error encoded data is further based on transmission channel conditions.

11. The method according to claim 9, wherein adapting the decoding of the error encoded data further comprises adapting a threshold value for error detection based on the retransmission status of the data and/or transmission channel conditions.

12. The method according to claim 11, further comprising:
 determining a probability of error in the decoding of the error encoded data based on the error detection coding; and
 comparing the probability of error with the threshold value.

13. A receiving node for a wireless communication network, the receiving node comprising:
 at least one receiver configured to receive error encoded data; and
 at least one processor operatively associated with the at least one receiver and configured to:
  determine a retransmission status of data by counting a number of transmission attempts of the data; and
  adapt decoding of the error encoded data based on the retransmission status of the data, wherein to adapt the decoding of the error encoded data, the at least one processor is configured to:
   adapt a coding length for decoding of an error detection coding that the data is encoded with, wherein to adapt the coding length, the at least one processor is configured to reduce the coding length; and
   adapt a correction coding length for decoding of forward error correction coding that the data is encoded with after the error detection coding, wherein to adapt the correction coding length, the at least one processor is configured to increase the correction coding length.

14. The receiving node according to claim 13, wherein the at least one processor is configured to adapt the decoding of the error encoded data further based on transmission channel conditions.

15. The receiving node according to claim 13, wherein the at least one processor is configured to adapt the decoding of the error encoded data by further adapting a threshold value for error detection based on the retransmission status of the data and/or transmission channel conditions.

16. The receiving node according to claim 15, wherein the at least one processor is further configured to:
 determine a probability of error in the decoding of the error encoded data based on the error detection coding; and
 compare the probability of error with the threshold value.

17. A non-transitory computer readable medium storing a computer program comprising instructions that, when executed by at least one processor of a transmitting node transmitting data by utilizing error detection coding that has a coding length in bits, cause the transmitting node to:
 determine a retransmission status of the data by counting a number of transmission attempts of the data;
 adapt the coding length based on the retransmission status of the data, wherein the coding length is adapted by reducing the coding length for retransmission of the data;
 perform forward error correction coding on the data after the error detection coding, the forward error correction coding having a correction coding length in bits; and
 adapt the correction coding length for the forward error correction coding, wherein the correction coding length is adapted by increasing the correction coding length for the retransmission of the data.

18. A non-transitory computer readable medium storing a computer program comprising instructions that, when executed by at least one processor of a receiving node receiving error encoded data, cause the receiving node to:
 determine a retransmission status of data by counting a number of transmission attempts of the data; and
 adapt decoding of the error encoded data based on the retransmission status of the data, wherein the decoding of the error encoded data is adapted by:
  adapting a coding length for decoding of an error detection coding that the data is encoded with, wherein adapting the coding length comprises reducing the coding length; and
  adapting a correction coding length for decoding of forward error correction coding that the data is encoded with after the error detection coding, wherein adapting the correction coding length comprises increasing the correction coding length.

* * * * *